United States Patent [19]

Anderson et al.

[11] Patent Number: 5,148,601
[45] Date of Patent: Sep. 22, 1992

[54] SPHERICAL DRAWING TEMPLATE

[76] Inventors: Richard H. Anderson; Robert R. Anderson; Richard R. Anderson, all of P.O. Box 1059, Trabuco Canyon, Calif. 92678

[21] Appl. No.: 728,736

[22] Filed: Jul. 12, 1991

Related U.S. Application Data

[63] Continuation-in-part of Ser. No. 420,136, Oct. 11, 1989, Pat. No. 5,038,482.

[51] Int. Cl.$^5$ ............................................. B43L 13/00
[52] U.S. Cl. .................................................. 33/21.2
[58] Field of Search ............... 33/26, 18.1, 21.1, 21.2, 33/22, 27.11, 22, 1 B, 24.1; 362/809; 434/131, 145-147, 153, 287, 135, 137, 88

[56] References Cited

U.S. PATENT DOCUMENTS

| | | | |
|---|---|---|---|
| 774,998 | 11/1904 | Willson | 33/1 B |
| 1,458,762 | 6/1923 | Hartman | 434/135 |
| 3,063,163 | 11/1962 | Dukes | 434/131 |
| 3,100,353 | 8/1963 | Chamberlin | 434/141 |
| 3,466,034 | 9/1969 | Sargent | 33/18.1 X |
| 4,364,176 | 12/1982 | Cassagnes et al. | 33/18.1 |
| 4,406,285 | 9/1983 | Villasenor et al. | 33/21.1 X |
| 4,559,705 | 12/1985 | Hodge et al. | 33/1 B |

FOREIGN PATENT DOCUMENTS 1240532  8/1960  France ................. 434/147

Primary Examiner—Harry N. Haroian
Attorney, Agent, or Firm—Stetina and Brunda

[57] ABSTRACT

A drawing template for facilitating the formation of images upon a spherical surface is disclosed. In a first embodiment the template comprises first and second transparent hollow hemispheres having indicia formed upon their surfaces such that the two hemispheres may be disposed about a spherical drawing surface and the indicia may then be used as a guide to form corresponding images upon the drawing surface. In a second embodiment, a planar sheet of flexible material is configured such that it will conform substantially to the shape of a sphere when placed in laminar juxtaposition therewith. Indicia formed upon the sheet of flexible material provide a guide by which images may be formed upon the drawing surface. Both embodiments of the drawing template of the present invention are particularly applicable for use with a three-dimensional drawing device which forms images upon the inner surface of a transparent sphere.

15 Claims, 1 Drawing Sheet

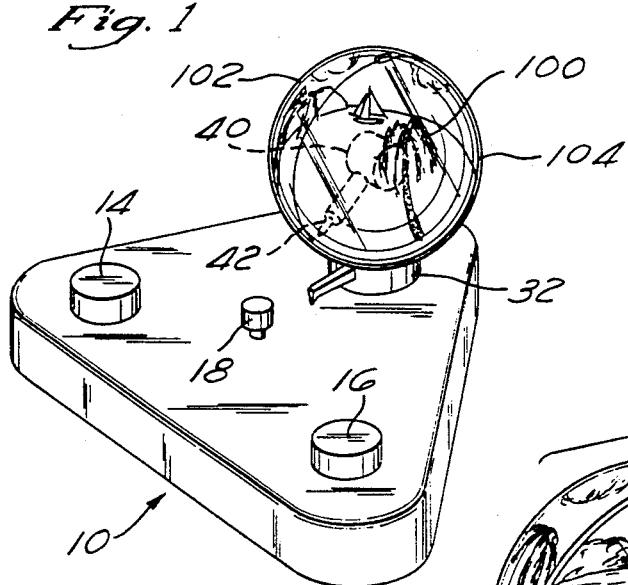
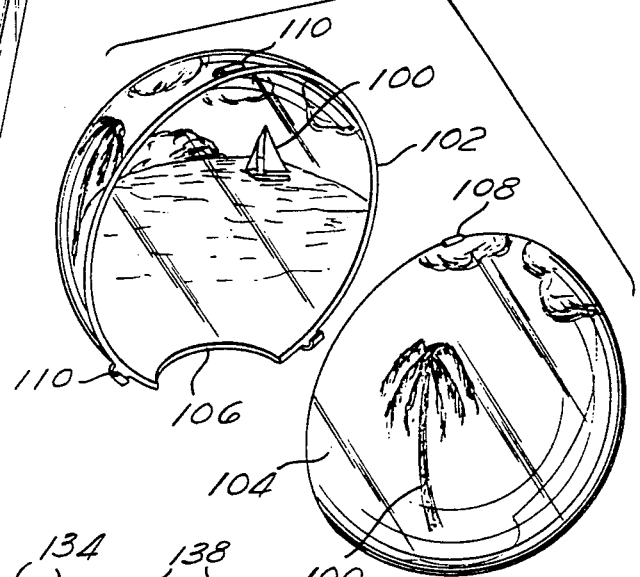
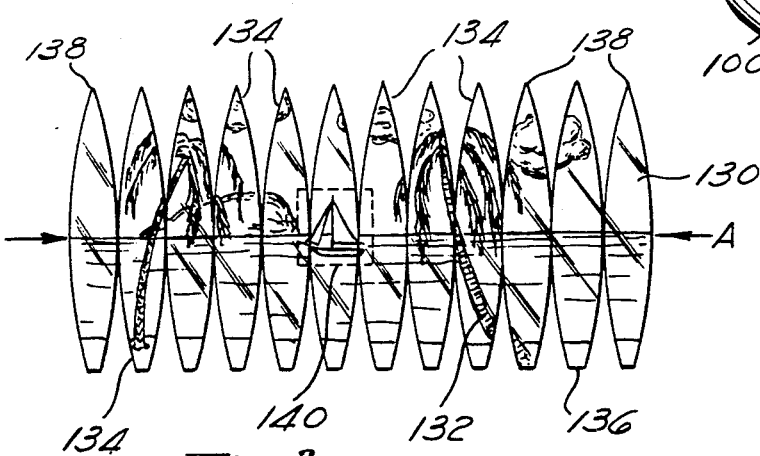
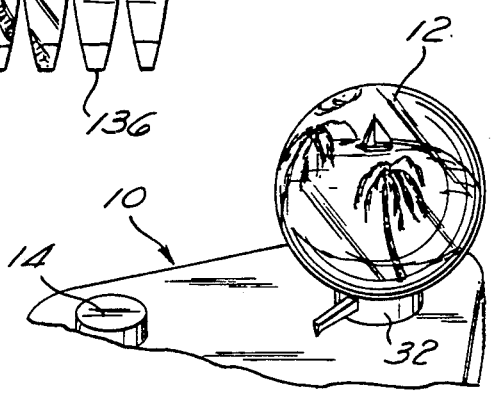

SPHERICAL DRAWING TEMPLATE

RELATED APPLICATION

This application is a continuation-in-part of Applicant's copending application Ser. No. 07/420,136, filed on Oct. 11, 1989, for THREE-DIMENSIONAL DRAWING DEVICE, now U.S. Pat. NO. 5,038,482 hereby incorporated by reference.

FIELD OF THE INVENTION

The present invention relates generally to drawing templates and more particularly to a spherical drawing template for facilitating the formation of images upon the inner surface of a hollow spherical drawing device, such as Applicant's THREE-DIMENSIONAL DRAWING DEVICE invention.

BACKGROUND OF THE INVENTION

Templates for facilitating the drawing of geometric figures, letters, and other images are well known. Draftsman commonly use such templates to conveniently and rapidly draw such geometric figures as rectangles, squares, and circles, as well as large block letters and the like upon paper when making mechanical drawings.

Such prior art templates typically comprise planar sections of rigid plastic having the appropriate shapes cut therefrom such that a pencil traced along the edge of a particular cutout will draw that image upon a sheet of paper. For example, when a draftsman desires to quickly form a box upon his drawing sheet, he may select a template having the appropriate size of rectangle formed therein and place that template at the desired location upon his drawing. The draftsman then simply places the tip of his pencil against the edge of the desired rectangle and traces the shape as required. Thus, desired images can be quickly and conveniently formed upon the drawing surface.

Additionally, templates and stencils are known for forming various images for artistic or ornamental purposes. For example, a solid image of a bird in flight may be cut into a sheet of paperboard and subsequently used for painting that image upon various surfaces. The paperboard could, for example, be placed in laminar juxtaposition to a wall upon which a mural is being painted and then used to form the image of the bird in flight thereupon. This can be accomplished by holding the stencil in place while spray painting, roller painting, brush painting, or otherwise applying a layer of paint through the stenciled cutout to form an image upon the wall. Those skilled in the art will appreciate that numerous appliances and applications exist in the art of stenciling of images upon surfaces.

In their above-referenced co-pending parent patent application for THREE-DIMENSIONAL DRAWING DEVICE, Applicant disclosed a drawing device for forming images upon the inside of a hollow transparent spherical drawing surface which is primarily intended for use as a teaching aid and toy. The THREE-DIMENSIONAL DRAWING DEVICE comprises a transparent hollow sphere, a powder material disposed within the sphere which adheres to the inner surface of the sphere, a scribe disposed within the sphere which can be used to draw upon the inner surface of the sphere by scraping off the powder material, and controls for manipulating the scribe such that images may be formed upon the inner surface of the sphere.

The controls for manipulating the scribe comprise a first control knob for positioning the scribe relative to the sphere in azimuth by rotating the sphere about its vertical axis, a second control knob for positioning the scribe relative to the sphere in altitude by rotating the scribe about a horizontal axis which is perpendicular to the longitudinal axis of the scribe, and a scribe retractor control for removing the scribe from the inner surface of the sphere to permit repositioning of the scribe.

As discussed in Applicant's co-pending parent patent application, a list of control positions can be provided to enable the user to reproduce a desired image upon the sphere, however, use of such a list of control positions can be somewhat difficult, especially for younger users Thus, it would be desirable to provide a means by which images may be traced when using the THREE-DIMENSIONAL DRAWING DEVICE.

SUMMARY OF THE INVENTION

The present invention specifically addresses and alleviates the above-mentioned deficiencies associated in the prior art. More particularly, the present invention comprises a drawing template for facilitating the formation of images upon a spherical surface.

In a first embodiment the template comprises first and second transparent hollow hemispheres having indicia formed upon their surfaces such that the two hemispheres may be disposed about a spherical drawing surface and the indicia may then be used as a guide to form corresponding images upon the drawing surface.

In a second embodiment a flat sheet of flexible material is configured such that it will conform substantially to the shape of a sphere when placed in laminar juxtaposition therewith. Indicia formed upon the sheet of flexible material provide a guide by which images may be formed upon the drawing surface. Both embodiments of the drawing template of the present invention are particularly applicable for use with a three-dimensional drawing device which forms images upon the inner surface of a transparent sphere.

Once installed upon the spherical drawing surface of a three-dimensional drawing device, the spherical drawing template of either embodiment of the present invention is used by manipulating the controls of the drawing device to cause the scribe to follow or trace the lines of the image formed thereon. Thus, a like or similar image may be drawn upon the drawing surface of the three-dimensional drawing device.

These, as well as other advantages of the present invention, will be more apparent from the following description and drawings. It is understood that the changes in the specific structure shown and described may be made within the scope of the claims without departing from the spirit of the invention.

BRIEF DESCRIPTION OF THE DRAWINGS

FIG. 1 is a perspective view of the THREE-DIMENSIONAL DRAWING DEVICE of Applicant's prior filed United States patent application having the SPHERICAL DRAWING TEMPLATE of the first embodiment disposed thereupon;

FIG. 2 is a perspective view of the SPHERICAL DRAWING TEMPLATE of the first embodiment;

FIG. 3 is a top plan view of the SPHERICAL DRAWING TEMPLATE of the second embodiment; and FIG. 4 is a sectional view of the THREE-DIMENSIONAL DRAWING DEVICE of Applicant's prior filed United States patent application having an image formed thereupon by tracing the indicia of the SPHERICAL DRAWING TEMPLATE of the present invention.

DETAILED DESCRIPTION OF THE PREFERRED EMBODIMENT

The detailed description set forth below in connection with the appended drawings is intended as a description of the presently preferred embodiments of the invention, and is not intended to represent the only forms in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The SPHERICAL DRAWING TEMPLATE of the present invention is illustrated in FIGS. 1-3 which depict two presently preferred embodiments of the invention. The spherical drawing templates are specifically designed for use on three-dimensional drawing devices such as that disclosed in Applicant's co-pending parent patent application Ser. No. 07/420,136, filed Oct. 11, 1989, the disclosure of which is expressly incorporated herein by reference. The first embodiment of the present invention is depicted in FIGS. 1 and 2. The second embodiment is depicted in FIG. 3. FIG. 4 depicts Applicant's invention of the THREE-DIMENSIONAL DRAWING DEVICE as disclosed in co-pending parent patent application Ser. No. 07/420,136, having an image formed thereon by the use of the SPHERICAL DRAWING TEMPLATE of the present invention.

Referring now to FIGS. 1 and 2, the first embodiment of the present invention comprises a rigid transparent/semi-transparent member or sphere comprised of first 102 and second 104 hollow hemispheres which are sized and configured to be disposed in laminar juxtaposition to the hollow transparent sphere (12 of FIG. 4) of the THREE-DIMENSIONAL DRAWING DEVICE 10. Permanent indicia or inscribed images 100 are formed upon the hemispheres 102 and 104. A semi-circular cutout 106 is formed at the base of each hemisphere 102 and 104 to allow the hemispheres 102 and 104 to be disposed upon the hollow sphere 12. Male detents 108 formed upon the second hemisphere 104 are sized and configured to be received by female detents 110 formed upon the first hemisphere 102 to attach the two hemispheres 102 and 104 together. Those skilled in the art will recognize that various other means are likewise suitable for attaching the two hemispheres 102 and 104 together.

Thus, the first embodiment of the SPHERICAL DRAWING TEMPLATE of the present invention may be snapped into place over the sphere 12 of a THREE-DIMENSIONAL DRAWING DEVICE 10 to provide a template for use in drawing images upon the device 10 with the user viewing through the template and manipulating the control knobs 14 and 16 to draw by following the indicia or images 100 formed on the template. A wide variety of images 100 can be formed upon the two hemispheres 102 and 104. For example, boats and trees, as depicted in FIG. 2, may be formed. Alternatively, many other images can be so formed to provide the user with a wide variety of artwork from which to form various scenes upon the inner surface of the sphere 12 of the THREE-DIMENSIONAL DRAWING DEVICE 10. Upon completion of the drawn scene or image, the user may remove the templates from the sphere 12 wherein the drawn scene or image may be clearly viewed upon the sphere.

Referring now to FIG. 3, the second embodiment of the SPHERICAL DRAWING TEMPLATE of the present invention is depicted. The second embodiment of the present invention comprises a transparent/semi-transparent member or planar sheet 130 of flexible material which is configured such that it will conform substantially to the shape of a sphere when placed in laminar juxtaposition therewith. Images or indicia 132 are formed upon the sheet 130 of flexible transparent material. The indicia 132 may be printed or etched upon one or both surfaces of the sheet 130.

The planar sheet 130 adheres via static or adhesive forces to the spherical surface of the THREE-DIMENSIONAL DRAWING DEVICE 10 such that the flat sheet 130 of flexible transparent material substantially surrounds the spherical surface 12. Cutouts 134 formed along the upper and lower edges of the sheet 130 permit the sheet 130 to conform to the shape of the sphere and to be placed in laminar juxtaposition therewith. The length A of the sheet 130 is approximately equal to the circumference of the sphere 12 such that wrapping the sheet 130 thereover will cause it to substantially cover the sphere. The flat tips 136 are provided along the lower surface of the sheet 130 such that a cutout (similar to 106 of FIG. 2) will be formed when the SPHERICAL DRAWING TEMPLATE of the second embodiment is positioned upon the THREE-DIMENSIONAL DRAWING DEVICE 10 to provide clearance for the base 32 thereof.

Materials will be selected for the sheet 130 such that an electrostatic-like attraction is present between the sheet 130 and the sphere 12. Thus, the sheet will removably adhere to the sphere 12 in the manner that vinyl holiday ornaments adhere to glass windowpanes. Alternatively, a light reusable adhesive layer or film may be applied to the sheet for such purpose.

The two hemispheres 102 and 104 of the first embodiment of the present invention may be comprised of plastic, acrylic plastic, or any other suitable transparent material. They are preferably formed by the injection molding or vacuum forming of plastic in such a manner that the desired indicia 100 are formed concurrently. That is, the injection or vacuum form molds may have the desired indicia formed thereon such that the desired image is formed directly onto the plastic surface at the time of injection molding or vacuum forming. The images formed upon the two hemispheres 102 and 104 may also be formed after molding using a printing process or by engraving the images into the surface thereof. Those skilled in the art will recognize that various other means are likewise suitable for forming images upon the two hemispheres 102 and 104.

Additionally, individual picture elements 140 may be formed such that the user may individually position the desired elements 140 upon the sphere 12 of the THREE-DIMENSIONAL DRAWING DEVICE 10 in order to customize his drawing. Each individual picture element 140 is comprised of a single piece of artwork, such as the sailboat depicted in picture element 140 of FIG. 3, and is provided in an appropriate shape, such as the dashed square around picture element 140. Thus, a plurality of such individual picture elements could comprise a complete scene.

Having described the structure of the SPHERICAL DRAWING TEMPLATE of the present invention, it may be beneficial to describe the operation thereof. To use the SPHERICAL DRAWING TEMPLATE of the first embodiment, the user first selects the desired image to be drawn. Generally, a wide variety of images will be supplied upon transparent hemispheres such that the user will have a wide variety of artwork from which to choose. After making his/her selection, the user snaps the two hemispheres over the sphere 12 of the THREE-DIMENSIONAL DRAWING DEVICE 10.

When using the SPHERICAL DRAWING TEMPLATE of the second embodiment, the user makes his selection of artwork and then wraps the flexible transparent material around the sphere 12 such that the pointed tips 138 converge at the upper-most portion of the sphere 12, thus substantially covering the sphere.

After installing the SPHERICAL DRAWING TEMPLATE of either the first or second embodiment of the present invention, the user then positions the scribe 42 of the THREE-DIMENSIONAL DRAWING DEVICE on a line of the template 100 or 130 and proceeds to follow the lines with the scribe by manipulating the scribe assembly 40 with the azimuth 14 and altitude 16 controls. The retractor knob 18 can be used to pull the scribe 42 away from the inner surface of the sphere 12 for repositioning without drawing.

Separate individual pieces of artwork 140 may be positioned as desired upon the surface of the sphere !2 such that the various images formed thereon may be drawn at the desired locations.

Thus, the SPHERICAL DRAWING TEMPLATE of the present invention provides the user with a simple and convenient means for forming images upon the THREE-DIMENSIONAL DRAWING DEVICE 12.

It is understood that the exemplary SPHERICAL DRAWING TEMPLATE described herein and shown in the drawings represents only a presently preferred embodiment of the invention. Indeed, various modifications and additions may be made to such embodiment without departing from the spirit and scope of the invention. For example, the SPHERICAL DRAWING TEMPLATE of the first embodiment need not be formed in two sections, but rather may be formed in a plurality of sections such that the sections may be interchanged and positioned as desired upon the sphere 12 of the THREE-DIMENSIONAL DRAWING DEVICE. Also, various sizes and shapes of the individual pieces 140 of artwork are contemplated. Thus, these and other modifications and additions may be obvious to those skilled in the art and may be implemented to adapt the present invention for use in a variety of applications.

What is claimed is:

1. In a device for forming images upon a spherical surface, the device having a substantially transparent hollow sphere, a powder material disposed within the sphere, a scribe disposed within the sphere, and a control mechanism for manipulating the scribe, an improvement comprising a transparent member disposable in laminar juxtaposition to the surface of the sphere and indicia formed upon the transparent member such that the indicia may serve as a guide for manipulation of the scribe.

2. The device as recited in claim 1 wherein said transparent member comprises:
    (a) a plurality of sections, each section conforming to the shape of a portion of a sphere; and
    (b) means for attaching said sections in laminar juxtaposition to the surface of a sphere.

3. The device as recited in claim 2 wherein said plurality of sections comprises two rigid sections, said rigid sections being formed of plastic and having inner and outer surfaces.

4. The device as recited in claim 3 wherein said indicia are etched onto at least one of said inner and outer surfaces.

5. The device as recited in claim 3 wherein said indicia are printed upon at least one of said inner and outer surfaces.

6. The device as recited in claim 3 wherein:
    (a) said two rigid sections are formed by injection molding; and
    (b) said indicia are formed upon at least one of said inner and outer surfaces of said two rigid sections during the injection molding process.

7. The device as recited in claim 3 wherein:
    (a) said two rigid sections are formed by vacuum forming; and
    (b) said indicia are formed upon at least one of said inner and outer surfaces of said two rigid sections during the vacuuming forming process.

8. The device as recited in claim 1 wherein said transparent member comprises a flat sheet of flexible material having first and second surfaces, said flexible material configured such that it will conform substantially to the shape of a sphere when placed in laminar juxtaposition therewith.

9. The device as recited in claim 8 wherein said transparent sheet of flexible material further comprises cutouts formed therein such that said sheet may be configured to the shape of a sphere.

10. The device as recited in claim 8 wherein said indicia are printed onto at least one of said first and second surfaces of said flexible material.

11. The device as recited in claim 8 wherein said indicia are etched into at least one of said first and second surfaces of said flexible materials.

12. A device for forming images upon a spherical surface, said device comprising:
    (a) a substantially transparent hollow sphere;
    (b) a powder material disposed within said sphere, said powder material adhering to the inner surface of said sphere when it comes into contact therewith;
    (c) a scribe disposed within said sphere for scraping said powder material therefrom to form images thereon;
    (d) a control mechanism for manipulating said scribe;
    (e) a transparent member disposable upon said sphere;
    (f) indicia formed upon said member; and
    (g) wherein said member is configured to be disposed in laminar juxtaposition to the surface of said sphere.

13. A device for forming images upon a spherical surface, said device comprising:
    (a) a substantially transparent hollow sphere;
    (b) a powder material disposed within said sphere, said powder material adhering to the inner surface of said sphere when it comes into contact therewith;
    (c) a scribe disposed within said sphere for scraping said powder material therefrom to form images thereon;

(d) a first control knob for positioning said scribe relative to said sphere in azimuth;

(e) a second control knob for positioning said scribe relative to said sphere in altitude;

(f) a scribe retractor control for removing the scribe from the inner surface of said sphere to permit repositioning of said scribe;

(g) wherein said first control knob positions said scribe relative to said sphere in azimuth by rotating said sphere about its vertical axis;

(h) wherein said second control knob positions said scribe relative to said sphere in altitude by rotating said scribe about a horizontal axis which is perpendicular to the longitudinal axis of said scribe;

(i) a transparent member disposable upon said sphere; and (j) indicia formed upon said member;

(k) wherein said member is configured to be disposed in laminar juxtaposition to the surface of said sphere.

14. A device for forming images upon a spherical surface, said device comprising:

(a) a substantially transparent hollow sphere;

(b) a powder material disposed within said sphere, said powder material adhering to the inner surface of said sphere when it comes into contact therewith;

(c) a scribe disposed within said sphere for scraping said powder material therefrom to form images thereon;

(d) a control mechanism for manipulating said scribe;

(e) a plurality of transparent interconnectable rigid sections, each section conforming to the shape of a portion of a sphere; and (f) indicia formed upon said rigid sections;

(g) wherein said plurality of rigid sections are configured to be disposed in laminar juxtaposition to the surface of said sphere.

15. A device for forming images upon a spherical surface, said device comprising:

(a) a substantially transparent hollow sphere;

(b) a powder material disposed within said sphere, said powder material adhering to the inner surface of said sphere when it comes into contact therewith;

(c) a scribe disposed within said sphere for scraping said powder material therefrom to form images thereon;

(d) a first control knob for positioning said scribe relative to said sphere in azimuth;

(e) a second control knob for positioning said scribe relative to said sphere in altitude;

(f) a scribe retractor control for removing the scribe from the inner surface of said sphere to permit repositioning of said scribe;

(g) wherein said first control knob positions said scribe relative to said sphere in azimuth by rotating said sphere about its vertical axis;

(h) wherein said second control knob positions said scribe relative to said sphere in altitude by rotating said scribe about a horizontal axis which is perpendicular to the longitudinal axis of said scribe;

(i) a plurality of transparent interconnectable rigid sections, each section conforming to the shape of a portion of a sphere; and (j) indicia formed upon said rigid sections;

(k) wherein said plurality of rigid sections are configured to be disposed in laminar juxtaposition to the surface of said sphere.

* * * * *